A. METZGER.
WELDING MACHINE.
APPLICATION FILED FEB. 23, 1909.

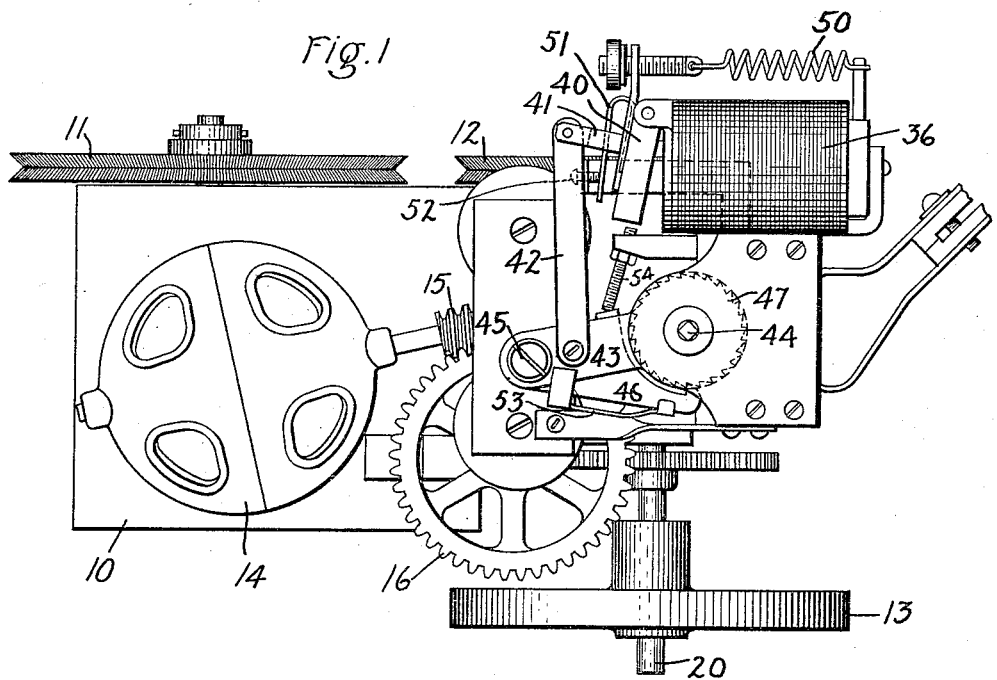
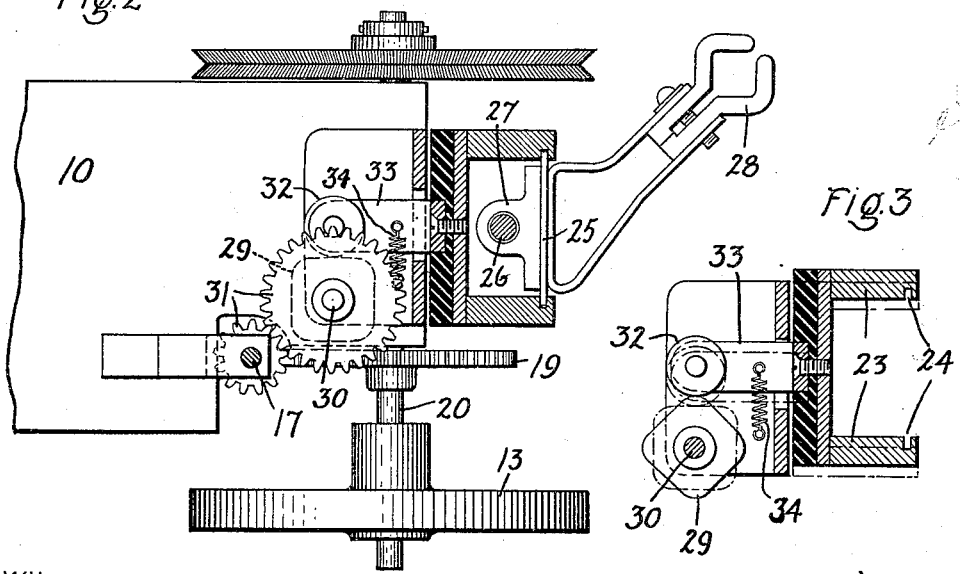
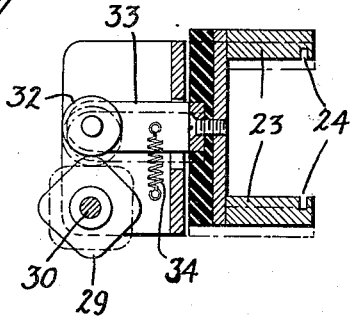

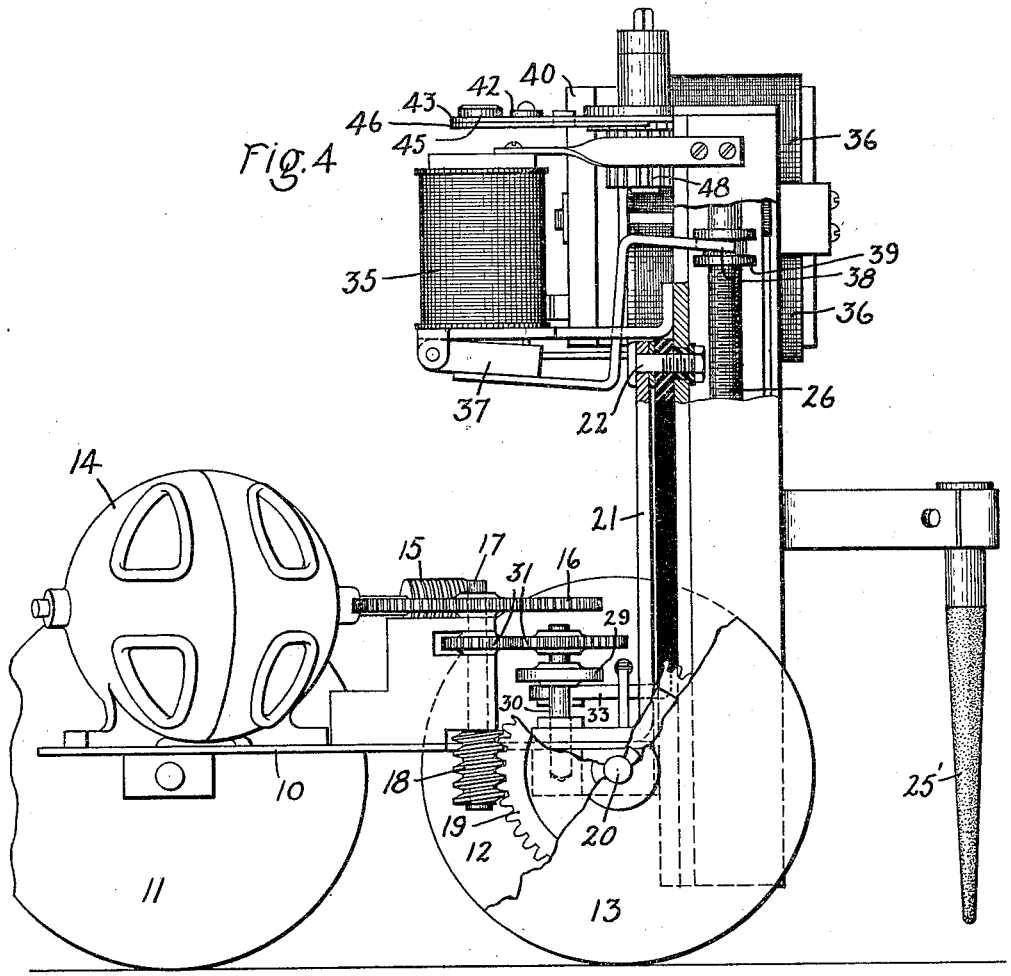

1,029,389.

Patented June 11, 1912.
3 SHEETS—SHEET 3.

Witnesses:
Lloyd C. Bush
J. Ellis Ellen

Inventor:
Amandus Metzger,
By Albert H. Davis
Atty.

UNITED STATES PATENT OFFICE.

AMANDUS METZGER, OF SCHENECTADY, NEW YORK, ASSIGNOR TO GENERAL ELECTRIC COMPANY, A CORPORATION OF NEW YORK.

WELDING-MACHINE.

1,029,389. Specification of Letters Patent. Patented June 11, 1912.

Application filed February 23, 1909. Serial No. 479,523.

*To all whom it may concern:*

Be it known that I, AMANDUS METZGER, a citizen of the United States, residing at Schenectady, county of Schenectady, State of New York, have invented certain new and useful Improvements in Welding-Machines, of which the following is a specification.

This invention relates to electric welding machines and has for its object the provision of an automatic device whereby an effective joint between metallic surfaces may be made in a simple and efficient manner.

While my invention is capable of general application in the art of electric welding, and may be adapted to a variety of uses, it is particularly well suited to the welding of seams and joints in which the surfaces to be welded are of no great area but of considerable length. In the welding of tanks, receptacles and the like, as well as in the manufacture of welded tubing, my invention finds special application. In the welding of the seams of a receptacle, for instance, it has been the practice to have the operation performed by hand. In the joint application filed by John L. Hall and myself, April 1st, 1907, Serial No. 365,677, there is described a machine in which one or more electric arcs are arranged to travel back and forth across the article to be welded. In this case the welding electrodes are supported on a long arm which extends over the surface to be welded. In the present invention I dispense with the supporting arm for the electrodes and make the whole device self-contained, by mounting the electrode upon a carriage which will automatically travel along the seam or surface to be heated. The carriage is driven by an electric motor and a guide wheel travels along the seam and accomplishes the welding automatically. It is evident that a portable welding machine of this character will have many advantages over those which require a fixed support, both as to cheapness and convenience. It is also evident that there are many places in which this small welding machine could be used, as, for instance, in the inside of tubes and the like, in which a device having a supporting arm could not be used. Other objects of my invention will appear in the course of the following specification, in which I have shown my invention embodied in concrete form for the purpose of illustration.

Figure 5:
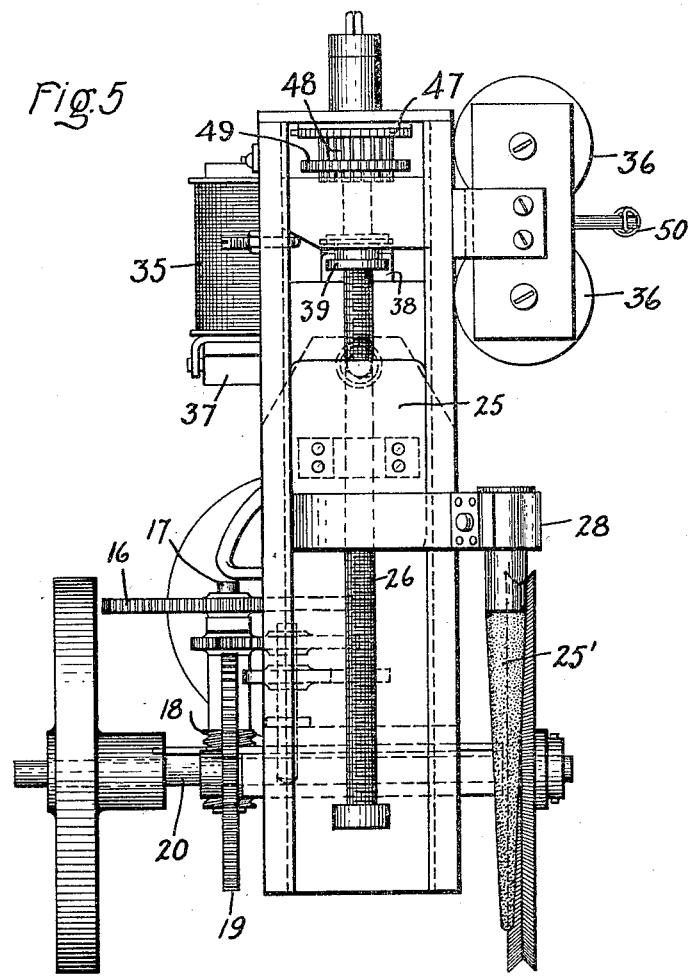

In the drawings, Figure 1 represents a plan view of my complete machine; Fig. 2 represents a fragmentary view of the same with the welding head in section; Fig. 3 represents a detail of the welding head; Fig. 4 represents a side elevation of my device partially broken away to show the operating mechanism; Fig. 5 shows a front elevation of the machine; and Fig. 6 represents a diagram of the circuit connections.

Referring to the drawings, 10 represents the platform or body of a carriage provided with two grooved guide wheels 11 and 12 on one side and a flat face traction wheel 13 on the other. An electric motor 14 is suitably mounted upon the carriage so as to propel the same by any suitable gearing. This propulsion may be accomplished by means of a worm 15 upon the motor shaft driving a worm wheel 16 secured to shaft 17. A worm 18 is secured to the shaft 17 and is arranged to drive a worm wheel 19 fixed to the driving axle 20 upon which the wheels 12 and 13 are mounted. Pivoted to this carriage is a welding head which carries a welding electrode. An angle bar 21 is secured to the forward part of the machine so as to extend vertically a considerable distance. To the upper end of this bar a welding head is pivoted by means of a pivotal bolt 22. The construction of the welding head, as shown in Fig. 3, is channel shaped, two sides of the channel 23 being provided with slots 24 in which the supporting arm 25 for the electrode 25' is arranged to slide. A lead screw 26 extends longitudinally of the head within the channel and a nut 27, which forms part of the arm 25, engages the screw. Arm 25 is provided with a clamp 28 for holding the electrode 25' and extends over toward the side of the machine so that the electrode will be in longitudinal alinement with the wheels 11 and 12. In order to cause the electrode to vibrate back and forth across the seam to be welded on its pivot 22, I provide a cam 29 secured to the shaft 30 which shaft is driven from shaft 17 by means of gears 31. This cam is arranged to engage the roller 32 on arm 33 projecting from the welding head. As the cam 29 rotates, the head will be vibrated back and forth, as shown in dotted lines in Fig. 3. A spring 34 is preferably provided to keep the roller in contact with the cam.

In order to make the welding machine entirely automatic, I provide automatic feeding and arc drawing mechanism, such as is usually provided in arc lamps. The arc drawing is accomplished by means of electromagnets 35, while the feeding mechanism is operated by electromagnets 36. One terminal of the electromagnet 35 is connected to the supply cable through the rheostat R, and the other to the welding head as indicated in Fig. 6. Electromagnets 35 are mounted on the upper portion of the welding head and provided with a pivoted armature 37, the free end of which is provided with a yoke 38 engaging a grooved nut 39 on the lead screw 26. When the magnet 35 is energized, it attracts its armature 37 and lifts the lead screw, which in turn lifts the electrode 25'. Magnets 36 for operating the feeding mechanism are likewise situated at the upper end of the welding head and provided with a pivoted armature 40 having a projection 41. This projection is connected by a link 42 with the lever 43 pivoted to the shaft 44. Pivoted to the free end of arm 43 at 45 is a ratchet arm 46, which extends inward toward the shaft 44, so as to engage the ratchet gear 47, secured to shaft 44. Just below the ratchet gear is a broad face gear 48, arranged to mesh with gear 49 on lead screw 26. An adjustable spring 50 is arranged to normally hold the armature 40 away from magnet 36, as shown in Fig. 1. Contact spring 51 is secured to the armature and arranged so as to contact with screw 52, which completes an electric circuit, as hereinafter described. When the magnet 36 is energized, the armature 40 will be attracted and the spring 50 placed under tension. This will force ratchet arm 46, which is held in contact with the ratchet wheel 47 by means of a spring 53, to advance along the teeth of the wheel. When the armature is attracted, the electric circuit of the magnet 36 is interrupted between spring 51 and screw 52 and the spring 50 returns the armature and connected parts so that the ratchet arm 46 turns the ratchet wheel, thereby turning the lead screw and lowering the electrode. An adjustable stop 54 is provided for the arm 43, so as to adjust the feeding mechanism as desired. Shaft 44 is squared at its upper end so that a handle may be fitted to it, in order to adjust the electrode manually.

Figure 6:
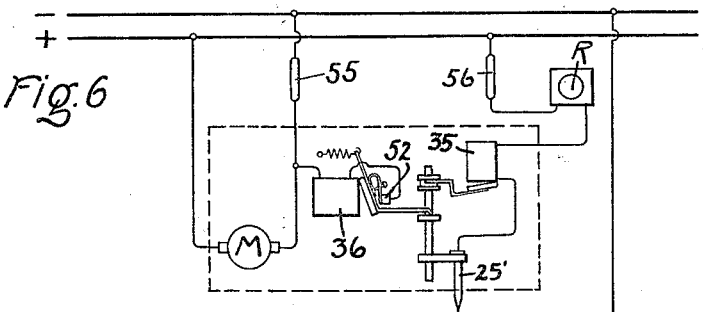

In Fig. 6 I have shown the circuit connections of my device. As shown in this diagram, when the switch 55 is closed, the motor M is connected across the line. Upon closing the switch 56, a circuit is completed from positive main, through rheostat R, coil 35, electrode 25', to the tank to be welded and back to the negative main. At the same time, a circuit in shunt to the arc is completed from the positive main, through rheostat R, coil 35, thence through the welding head to contact screw 52, through coil 36, switch 55, to the negative main. The coil 36 being in shunt to the arc receives more current as the resistance of the arc increases; that is, as the arc increases in length. When the resistance of the arc becomes so great, as by wearing away of the electrode, that it should be moved downward, magnet 36 receives enough current to operate its armature and causes it to vibrate back and forth until the electrode is moved downward in proper motion. In this way the entire machine is rendered automatic. The carriage is simply placed upon the part to be welded with the wheels 11 and 12 upon the seam. When the switches are closed, the carriage will advance at the proper speed along the seam, drawing an arc and causing the seam to be welded. At the same time the electrode is vibrated across the seam, so as to make a more efficient and neater joint.

While I have described my invention in accordance with the patent statutes as embodying certain structural features and as operating in a definite manner for the purpose of illustration, it should be understood that I do not limit my invention thereto, since various modifications will suggest themselves to those skilled in the art without departing from the spirit of my invention, the scope of which is set forth in the annexed claims.

What I claim as new and desire to secure by Letters Patent of the United States, is:—

1. A welding machine comprising a carriage arranged to be propelled upon the surface of the material to be welded, welding means movably mounted upon the carriage and a single means to move the carriage and the welding means.

2. A welding machine comprising a carriage arranged to be propelled upon the surface of the material to be welded, a welding electrode movably mounted on the carriage in proximity to the material, and a single means to move the carriage and the electrode.

3. A welding machine comprising a carriage, an electric motor mounted thereon to propel the same upon the surface of the material to be welded, a welding electrode mounted on said carriage in proximity to the material and connections whereby the motor moves the electrode with reference to the carriage.

4. A machine for welding seams comprising an electrically propelled carriage arranged to propel itself upon the surface of the material to be welded parallel with the seam, and a welding electrode mounted on the carriage in proximity to the seam.

5. A machine for welding seams comprising a carriage having a wheel arranged to travel along the seam, an electric motor mounted thereon so as to propel the same and an electrode mounted upon said carriage in longitudinal alinement with said wheel.

6. A machine for welding seams comprising a carriage having a wheel arranged to travel along the seam, an electric motor mounted thereon so as to propel the same, an electrode mounted upon said carriage in longitudinal alinement with said wheel and connections whereby the motor moves the electrode with reference to the carriage.

7. A machine for welding seams comprising a carriage having a wheel arranged to travel along the seam, an electric motor mounted thereon so as to propel the same, an electrode mounted upon said carriage in longitudinal alinement with said wheel and connections whereby the motor causes the electrode to vibrate across the seam.

8. A machine for welding seams comprising an electrically propelled carriage having a wheel arranged to travel along the seam and an electrode mounted upon the carriage in proximity to the seam.

9. A machine for welding seams comprising an electrically propelled carriage having a wheel arranged to travel along the seam, an electrode mounted upon said carriage in proximity to the same and connections whereby the motor moves the electrode with reference to the carriage.

10. A welding machine comprising a wheeled carriage arranged to be propelled upon the material to be welded, a guide wheel, an electrode mounted on the carriage in proximity to the guide wheel and a single means to move the carriage and electrode.

11. A machine for welding seams comprising a carriage provided with a grooved wheel arranged to travel along the seam, an electric motor mounted thereon and arranged to propel the same, a welding electrode mounted upon said carriage in longitudinal alinement with said wheel, automatic feeding mechanism for said electrode and connections whereby the motor causes the electrode to vibrate back and forth across the seam.

12. A welding machine comprising a carriage adapted to run on the material to be welded, an electric motor, a welding electrode mounted on said carriage and connections whereby the carriage and the electrode with reference to the carriage are simultaneously moved.

In witness whereof, I have hereunto set my hand this 20th day of February, 1909.

AMANDUS METZGER.

Witnesses:
BENJAMIN B. HULL,
HELEN ORFORD.

---

Copies of this patent may be obtained for five cents each, by addressing the "Commissioner of Patents, Washington, D. C."